United States Patent [19]
Peiffer et al.

[11] Patent Number: 5,901,572
[45] Date of Patent: May 11, 1999

[54] AUXILIARY HEATING AND AIR CONDITIONING SYSTEM FOR A MOTOR VEHICLE

[75] Inventors: Larry Peiffer, Whitewater, Wis.; Terry Zeigler, Bryon; William G. Guo, Davis Junction, both of Ill.

[73] Assignee: Rocky Research, Boulder City, Nev.

[21] Appl. No.: 08/568,659

[22] Filed: Dec. 7, 1995

[51] Int. Cl.$^6$ .............................. F25B 29/00; F25B 17/08
[52] U.S. Cl. ................................ 62/480; 62/325; 62/478; 62/112; 62/244; 165/104.12; 165/42; 165/43; 237/12.3 A
[58] Field of Search ................................ 62/480, 112, 478, 62/325, 244; 237/12.3 A; 165/104.12, 42, 43

[56] References Cited

U.S. PATENT DOCUMENTS

| | | | |
|---|---|---|---|
| 2,795,115 | 6/1957 | Kumm | 62/112 |
| 3,828,566 | 8/1974 | Wetzel | 62/480 |
| 4,138,861 | 2/1979 | Wurm | 62/480 |
| 4,199,959 | 4/1980 | Wurm | 62/480 |
| 4,574,874 | 3/1986 | Duran | 62/480 |
| 4,742,868 | 5/1988 | Mitani et al. | 62/480 |
| 4,922,998 | 5/1990 | Carr | 165/10 |
| 4,924,676 | 5/1990 | Maier-Laxhuber et al. | 62/480 |
| 5,054,540 | 10/1991 | Carr | 165/10 |
| 5,056,588 | 10/1991 | Carr | 165/10 |
| 5,199,461 | 4/1993 | Carr | 137/625.44 |
| 5,277,038 | 1/1994 | Carr | 62/434 |
| 5,388,423 | 2/1995 | Khelifa | 62/480 |
| 5,441,716 | 8/1995 | Rockenfeller | 423/299 |
| 5,518,069 | 5/1996 | Maier-Laxhuber et al. | 62/480 |
| 5,556,028 | 9/1996 | Khelifa | 237/12.3 A |

FOREIGN PATENT DOCUMENTS

| | | | |
|---|---|---|---|
| 0091382 | 10/1983 | European Pat. Off. | 62/480 |
| 2052894 | 5/1972 | Germany | 237/12.3 A |
| 3324138 | 1/1985 | Germany | 237/12.3 A |

OTHER PUBLICATIONS

3–page brochure *Introducing CabinAir Shape Energy Resources*, a Mid–America Capital Resources Company, date unknown.
6–page brochure *Innovative Compressed–Air Technologies that Boost Production*, Vortec Corporation, an Illinois Tool Works Company, date unknown.
2–page brochure *'Green' Refrigerator Is Like No Other*, reprinted from Appliance Manufacturer, Jul. 1995.
14–page brochure *Thermoelectric Products*, Marlow Industries, Inc., 1992.
2–page brochure *The World's Most Thermally–Efficient Cabinet, Using Environmentally Friendly Refrigeration Technology*, Marlow Industries, Inc., date unkown.

*Primary Examiner*—John K. Ford
*Attorney, Agent, or Firm*—Knobbe, Martens, Olson & Bear, LLP

[57] ABSTRACT

An auxiliary heating and air conditioning system has an output for selectively delivering warm air and cool air to the passenger area of a motor vehicle. The auxiliary system includes a thermo-electric cooler, which is a solid state device having a hot side and a cold side. Heat exchangers are disposed in connection with the hot side and cold side of the thermo-electric cooler to facilitate the transfer of thermal energy away from each side of the thermo-electric cooler. Two fans are disposed in fluid communication with the first and second heat exchangers to transfer air across the exchangers and to the output for selectively heating and cooling the passenger area of the motor vehicle. Interposed between the first and second heat exchangers and the output, are first and second arrays of energy storage panels. Preferably, these panels contain phase change material which is charged during the operation of the motor vehicle to change phase and therefore store thermal energy. When the motor vehicle is shut down, the thermal energy stored within the first and second arrays of energy storage panels is utilized to provide warm and cool air (as carried by the blower) to the internal passenger space of the motor vehicle. Similar heating and air conditioning systems are also provided that, rather than a thermo-electric cooler, utilize a vortex tube or sorption refrigeration technology.

6 Claims, 6 Drawing Sheets

AUXILIARY HEATING AND AIR CONDITIONING SYSTEM FOR A MOTOR VEHICLE

BACKGROUND OF THE INVENTION

1. Field of the Art

The present invention relates to heating and air conditioning systems, and more particularly, to a relatively low power auxiliary heating and air conditioning system for a motor vehicle, configured to operate when the vehicle is shut down.

2. Discussion of the Related Art

As is known, large over-the-road vehicles such as tractor-trailer trucks are used for transporting a wide variety of items. Often, the transport routes of these vehicles are extremely long, frequently extending cross-country. On such long routes the drivers of these vehicles frequently sleep within the vehicle. Accordingly, and as is known, the passenger area of a large tractor-trailer truck is typically divided into a cab area and a bunk area; the cab area being the forwardmost area, and the bunk area (also known as the sleeper) located just behind the cab area. Frequently, the bunk area is separated from the cab area by a curtain or other divider, and includes a cot on which the driver can sleep.

It can certainly be appreciated that on hot summer nights or cold winter nights, the driver will operate the air conditioning system or heating system, at least in the bunk area, to maintain a comfortable sleeping climate. Presently, this is done in any of several ways. First, the driver may leave the truck running in idle to maintain power to the heating and air conditioning system, so that the appropriate temperature in the bunk area may be maintained. Since the drivers typically sleep for several hours at a time, this approach is undesirable in that it wastes fuel and places undue wear on engine components that are left running. Furthermore, the constant engine noise is distracting, not to mention the release of carbon monoxide and other pollutants into the environment.

Another approach taken by drivers is often to superheat or supercool the bunk area, just before shutting the engine down. In this regard, the driver may direct the heating and air conditioning system to the bunk area and either overheat the area in the wintertime or cool it to an extremely low temperature in the summertime. Since the truck body provides some insulating characteristics, it takes a certain amount of time for the indoor and outdoor temperature to equalize. By superheating or supercooling the bunk area, (i.e., increasing the temperature differential), the driver can extend the time period time before the temperatures have equalized and the bunk area is uncomfortably cool or hot. Certainly, in mild climate areas, this approach is sufficient. However, in extremely harsh climates, this approach does not provide a sufficient time period of comfortable climate before the driver must restart the engine. Moreover, this approach tends to result in an uncomfortably hot or cold climate immediately after the driver shuts off the engine (i.e., the superheated or supercooled climate).

Another approach has been to utilize a self-contained heating and air conditioning system. That is, systems are known, that are independent of the vehicular heating and air conditioning system, to provide heating and air conditioning to the passenger space, and more particularly, to the bunk space of a tractor-trailer vehicle. These systems employ a small generator sufficient to power a small scale heating and air conditioning system that is directed to heat and cool the small bunk area of a tractor-trailer vehicle. Advantageously, these systems do not consume the large volume of fuel required to maintain the vehicle engine in idle. Nor do they result in the engine component wear or pollutant and noise output that result from running the engine in idle to maintain the vehicular heating and air conditioning system. These systems, however, do impose cost and space requirements that are often deemed excessive and undesirable.

Another approach known for heating and cooling the bunk space of a tractor-trailer vehicle employs the use of thermal storage media to store thermal energy during the normal operation of the vehicular heating and air conditioning system and utilize this stored energy during the down time of the vehicle to heat and cool the passenger compartment. For example, U.S. Pat. No. 5,277,038 discloses a thermal storage reservoir adapted for either cool thermal storage or warm thermal storage. A stated object of the invention described in the '038 patent is to provide additional cooling and/or heating from a thermal storage system, and to release the cooling or heating at a desired time, such as prior to entering the vehicle or during vehicle startup. Thus, the thermal storage system of the '038 patent is only directed to providing heating and cooling for temporary periods.

Indeed, it is appreciated from the architecture of the system in the '038 patent that the additional heating and cooling provided by the thermal storage reservoir is directed for providing auxiliary heating and cooling for generally short periods of time. To be sure, a prohibitive large mass of thermal storage would be required to provide extended periods of operation. This limitation is due in part to another stated object of the invention therein, which seeks to provide a system that is readily retrofit to existing vehicles with minimum modifications to the vehicle. In this regard, and as described in the '038 patent, the thermal storage means is charged for cool storage by circulation of cool air directed across a heat exchanger. This cool air is the same air utilized in the vehicle's air conditioning system, which is typically about 55° F. It is known that the thermal storage capability is proportional to the product of the mass of thermal storage medium and the temperature of that medium. Thus, if the medium is charged to approximately 55° F. by utilizing the existing vehicular air conditioning system, then the mass of the thermal storage system will determine the thermal storage capabilities of the system.

SUMMARY OF THE INVENTION

Accordingly, it is a primary aim of the present invention to provide an improved thermal storage system for use in motor vehicles, providing an extended period of heating and cooling while the motor vehicle engine is shut down.

A more specific object of the present invention is to provide an auxiliary heating and air conditioning system for a motor vehicle that operates to store thermal and/or electrical energy while the vehicle engine is running and provide heating and cooling to the passenger compartment of the vehicle for extended periods of time while the vehicle engine is shut down.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to an auxiliary heating and air conditioning system having an output that selectively delivers warm and cool air to the passenger area of the motor vehicle. In accordance with one aspect of the present invention, a thermo-electric cooler having a hot side and a cold side is electrically connected to a power source, such as the vehicle alternator, battery or auxiliary battery. First and second heat exchangers are disposed in connection with the thermo-electric cooler to transfer thermal energy away from the thermo-electric cooler. Specifically, one heat exchanger is disposed is connection with the hot side of the thermo-electric cooler while the other heat exchanger is disposed in connection with the cold side of the thermo-electric cooler. Finally, two blowers are disposed in fluid communication with the first and second heat exchangers, wherein the blowers are operative to blow air across the heat exchangers to transfer thermal energy away from the corresponding side of the thermo-electric cooler, and transfer the thermal energy to the output. Preferably, the blowers are disposed to communicate with both the first and second heat exchangers, so as to deliver cold air to the output, and therefore to the passenger area of the motor vehicle, delivering hot air outside the vehicle.

In accordance with another aspect of the present invention, energy storage panels are utilized to store thermal energy to provide auxiliary heating and cooling during times when the vehicle engine is not running. In this regard, first and second arrays of panels containing phase change material are disposed downstream of the first and second heat exchangers. Air delivered by the blower across the heat exchangers thereafter crosses the first and second arrays of energy storage panels. The hot and cold thermal energy from the first and second heat exchangers operate to heat and cool, respectively, the first and second arrays of energy storage panels. Preferably, the phase change material that is used to fill the first and second arrays of energy storage panels is selected so that the hot and cold air transferred from the first and second heat exchangers is sufficient to cause the material within the energy storage panels to change state or phase (e.g., from liquid to solid). Thereafter, when the motor vehicle engine is shut down, energy stored within the first and second arrays of energy storage panels is released to provide warm and cool air delivered by the blower to the output.

In accordance with another aspect of the present invention, a vortex tube is utilized in place of the thermo-electric cooler, to provide warm and cool air to the passenger area of the vehicle. In this regard, an air compressor is disposed to provide compressed air input to the vortex tube. This compressor may be the existing vehicle air compressor or an auxiliary compressor. The vortex tube then provides both a hot and cold air exhaust which are capable of delivering extremely hot and extremely cold air. For example, temperatures as high as 212° F. and as low as –50° F. may be achieved from vortex tubes having an input of air compressed at 100 PSIG. First and second arrays of energy storage panels are, like the previous embodiment, disposed downstream of the vortex tube, so that the hot and cold outlets of the vortex tube serve to charge the energy storage panel. It is contemplated that the vehicle alternator will power the air compressor during the charge cycle. When, however, the vehicle engine is shut down, the vehicle batteries are utilized to operate a blower that is disposed to selectively deliver an air stream across the first and second arrays of energy storage panels to selectively deliver warm and cool air to the passenger space of the vehicle.

In accordance with yet another embodiment of the present invention, a sorption system (including adsorption and/or absorption refrigeration technology) is utilized to provide auxiliary heat and air conditioning to the passenger space of a motor vehicle. In this embodiment, an auxiliary refrigerant circulatory system is configured to have an evaporator and condenser serially disposed within a circuitous refrigerator line, and therefore operative to vaporize and condense the refrigerant fluid circulating within the line. A container having sorbent material for absorbing or adsorbing vaporized refrigerant is disposed so as to intersect the refrigerant line between the evaporator and condenser, where the refrigerant fluid is substantially in a gaseous or vapor state. An electric heater is further disposed within the sorbent container to provide additional heating to facilitate the sorption process. Finally, a multi-channel ventilation system is provided and includes a blower disposed to force air through the channels of the system toward the output of the auxiliary system within the passenger space of the vehicle. The channels of the multi-channel ventilation system are disposed to intersect the evaporator, the condenser, and the sorbent container. During the discharge cycle, while the vehicle engine is shut down, the blower is operative to force air through the channels intersecting the evaporator and the sorbent container. Air crossing the evaporator is cooled while air crossing the sorbent container is heated. These channels are then configured to selectively deliver air to the output to heat and cool the passenger space of the motor vehicle.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENTS

Figure 1:
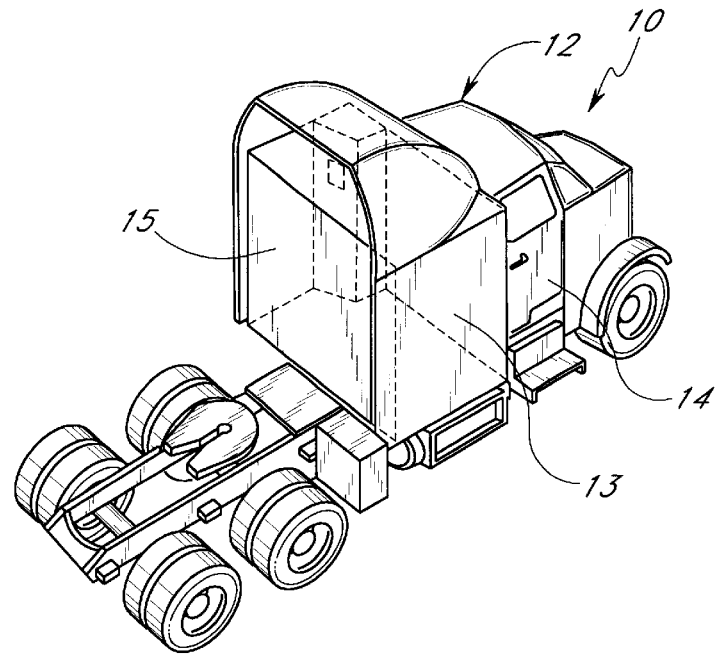
FIG. 1 illustrates a fragmentary view of the tractor of a tractor-trailer vehicle having a passenger area partitioned into cab and bunk areas.

Referring now to the drawings, FIG. 1 shows a tractor of a tractor-trailer vehicle, generally designated by reference numeral 10. More specifically, the tractor portion of the tractor-trailer vehicle 10 includes an interior space defining a passenger area 12 which is further partitioned, as by curtain 13, into a cab area 14 and a bunk area 15. It is typically desired to partition the passenger area into cab and bunk areas 14, 15 and to provide independent heating and cooling capabilities for each internal area. In this way, energy may be conserved by directing the heating and cooling to the cab area 14 while the driver is operating the vehicle, and directing the heating and cooling capabilities to the bunk area 15 while the vehicle is shut down and the driver is sleeping. The preferred embodiment of the present invention is directed to an auxiliary heating and air conditioning system for supplying heat and air conditioning to the bunk area 15 of a tractor-trailer vehicle 10 while the engine (not shown) is shut down. In one embodiment, the present invention operates to provide a low-power heating and air conditioning system independently powered by an auxiliary power source. In another embodiment, the present invention utilizes energy storage means in connection with an auxiliary heating and air conditioning system to further enhance the capacity of the auxiliary heating and air conditioning system.

Figure 2:
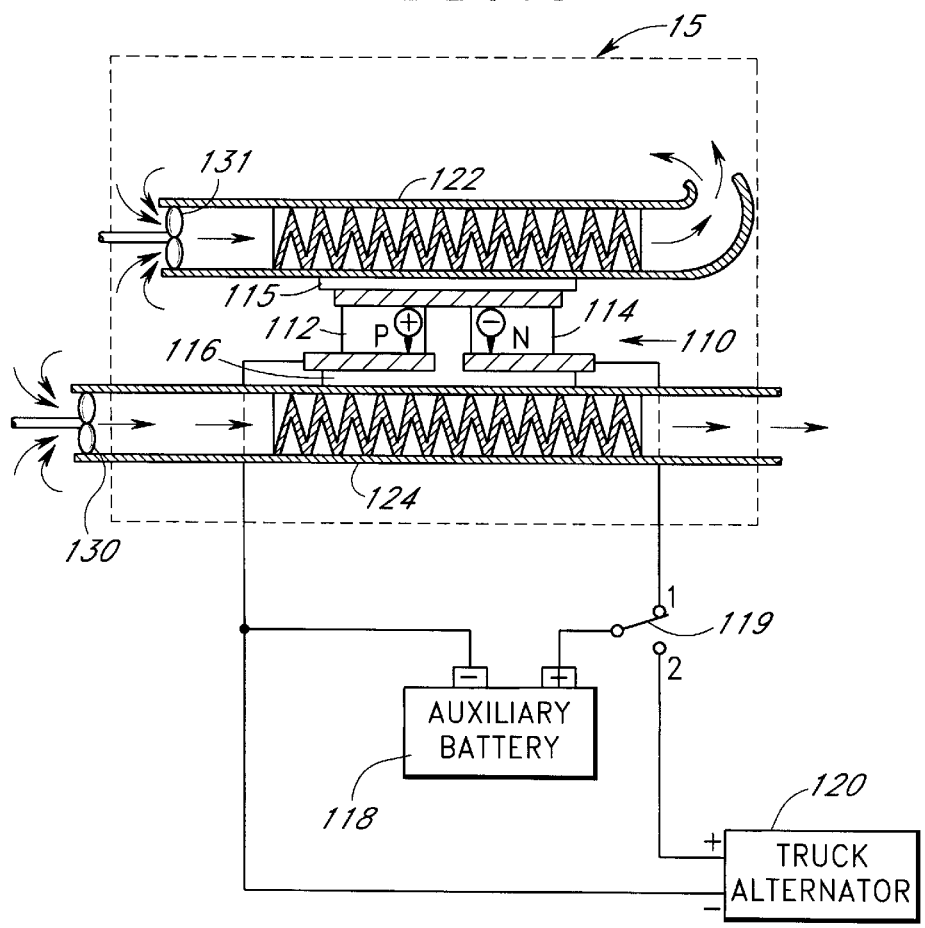
FIG. 2 illustrates one embodiment of the present invention utilizing a thermo-electric cooler to provide auxiliary cooling to the bunk area of a motor vehicle.

Referring now to FIG. 2, a schematic diagram of an auxiliary air conditioning system constructed in accordance with the present invention, is shown. A thermo-electric cooler 110 resides at the heart of the auxiliary system of the illustrated embodiment. A thermo-electric cooler 110 is a solid-state device having a P-type thermal element 112 and an N-type thermal element 114. Applying a positive DC voltage across the N-type thermal element 114 causes electrons to pass from the P-type thermal element 112 to the N-type thermal element 114. The thermal elements 112 and 114 are sandwiched between two ceramic plates, a cold side ceramic plate 115 and a hot side ceramic plate 116. The single P-type thermoelement 112 and N-type thermoelement 114 are commonly referred to as a couple, and a thermo-electric cooler 110 may be fabricated with as few as one couple to as many as several hundred couples sandwiched between two ceramic plates.

Preferably, an auxiliary battery 118 is used to provide the DC voltage across the P-type and N-type thermoelements 112 and 114. A switch 119 is provided to facilitate the charging of auxiliary battery 118 during normal vehicle operation. More specifically, when the motor vehicle is in operation, the switch 119 is in position 2. The output of the vehicle alternator 120 is electrically connected across the terminals of the auxiliary battery 118. During this time, no load is placed on the battery 118 and, as is known, the alternator 120 serves to charge the auxiliary battery 118. When the vehicle is shut down and auxiliary cooling is desired, the switch 119 is placed in position 1, which electrically connects the terminals of the battery 118 across the thermoelements 112 and 114 of the thermo-electric cooler 110.

Heat absorption (i.e. cooling) of the thermo-electric cooler 110 is proportional to the current and therefore the number of thermo-electric couplings, drawn from the auxiliary battery 118. As current is drawn from the auxiliary battery 118 through the thermo-electric cooler 110, the temperature of the cold side ceramic plate 115 will decrease while the temperature of the hot side ceramic plate 116 will increases. First and second heat exchangers 122 and 124 are provided to transfer the thermal energy away from the ceramic plates 115 and 116. The heat exchangers 122 and 124 may take the form of any of a variety of mechanical structures known for transferring heat. For example, a plurality of thermally conductive fins may be disposed in connection with the ceramic plates 115 and 116 to conduct thermal energy away from the plates. Thermal energy may then, in turn, be transferred from these fins through convection by directing an air flow across the fins. The particular structure, however, of the heat exchangers has not been illustrated as it is not deemed to form part of the present invention and, accordingly, will not be described in detail herein. Suffice it to say that one of ordinary skill in the art will appreciate that a variety of heat exchangers may be implemented consistent with the spirit of the present invention.

Two fans 130 and 131 may be provided in connection with both heat exchangers 122 and 124 to direct the flow of air across each. In this regard, the fans 130 and 131 may be powered from the vehicle battery (not shown). Air directed from fan 131 to flow through the first, or cold side heat exchanger 122 is cooled while air directed from fan 130 and flowing through the second or hot side heat exchanger 124 is heated. For example, it may be desired to maintain the bunk area 15 of the motor vehicle at 75° F. in an environment where the air temperature outside the vehicle may be approximately 80°. It is contemplated that a cold side heat exchanger 122 of typical efficiency will cool the air from 80° F. to approximately 65° F., for delivery to the bunk space of the motor vehicle. Conversely, the temperature of the air passing through the hot side heat exchanger 124 will be elevated from 80° to approximately 85° F. before being expelled to ambient space outside the passenger area of the motor vehicle.

As shown in the figure, air directed through the cold side heat exchanger 122 is air recirculated from the bunk space 15 of the vehicle 10, while air directed through the hot side heat exchanger 124 is drawn from the ambient space outside the vehicle. It is understood that, since the system of FIG. 2 is intended to provide air conditioning to the bunk space 15, the ambient temperature will be higher than the temperature of the bunk space.

It will be appreciated that the auxiliary battery 118 will be chosen to provide several hours of operation of the thermo-electric cooler 110 from a single battery charge. In this regard, several auxiliary batteries 118 may be connected in parallel to provide sufficient energy storage to achieve this object. Furthermore, it is appreciated that the solid state operation of the thermo-electric cooler described above provides significant advantages over traditional refrigeration systems which are powered by compressor and use CFCs, HFCs, or HCFCs. Thus, the traditional pollutants utilized in connection with conventional refrigeration systems are eliminated, resulting in an environmentally improved device. Moreover, because the thermo-electric cooler 110 is a solid state device, having no moving parts, it is exceedingly reliable.

Figure 3:
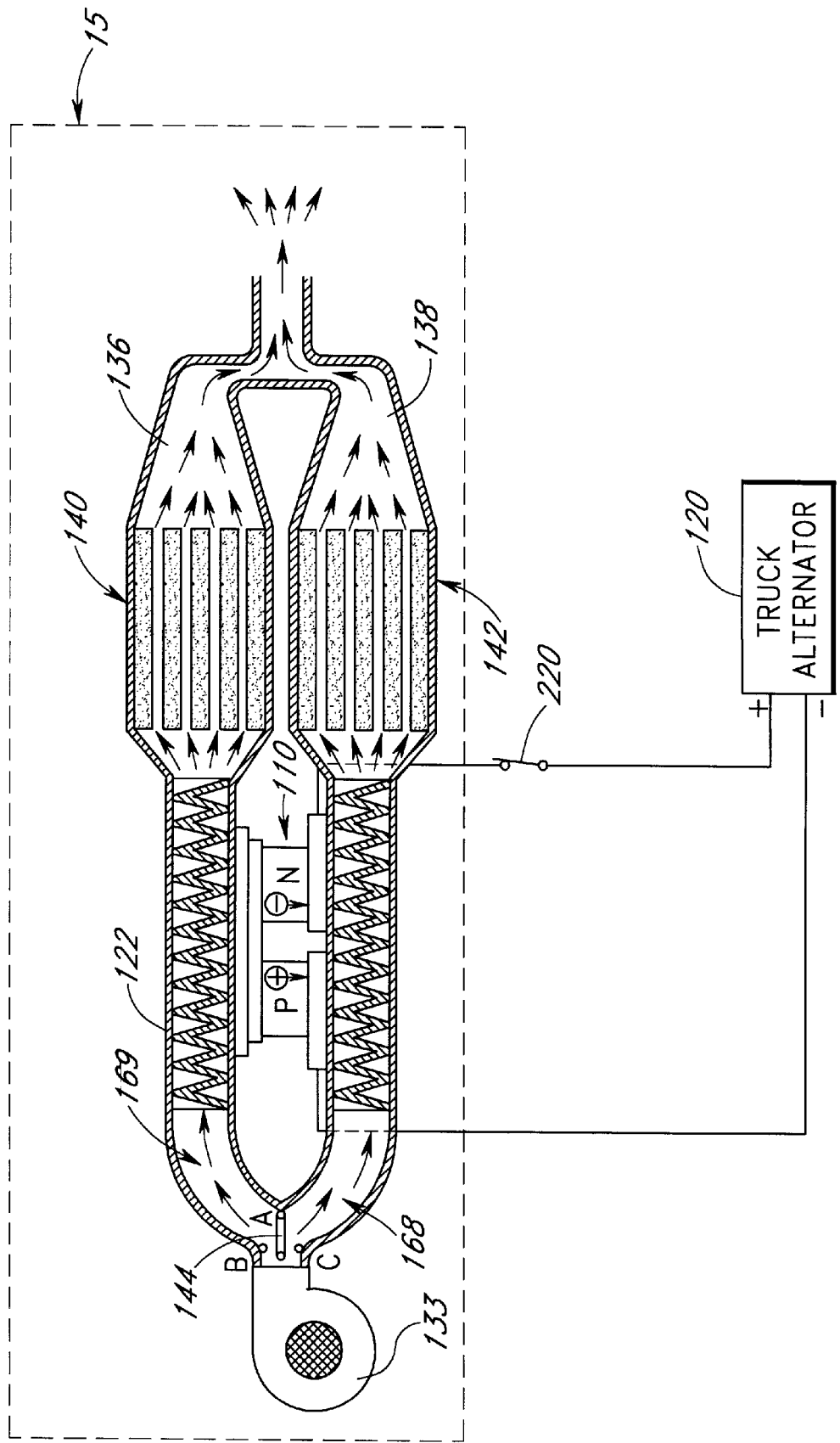
FIG. 3 is a schematic diagram of an alternative embodiment of the present invention utilizing thermal storage panels in connection with a thermo-electric cooler to provide heating and cooling to the bunk area of a motor vehicle.

Turning now to FIG. 3, an alternative embodiment to the present invention is illustrated. This embodiment is substantially similar to the embodiment shown and described in connection with FIG. 2, but further includes energy storage panels 140, 142 in connection with the output of the thermo-electric cooler 110. Air is delivered by fan 133 down channels or passageways 136 and 138, thereby cooling the air passing through the cold-side channel 136 and warming the air passing through hot-side channel 138. A first and second array of energy or thermal storage panels 140 and 142 serve to store thermal energy during a charge cycle and release thermal energy during a discharge cycle. In this regard, the embodiment of FIG. 3 differs substantially from the embodiment of FIG. 2, in that the embodiment of FIG. 3 is intended to operate when the motor vehicle is running, to charge the energy storage panels 140 and 142.

More specifically, during normal operation of the motor vehicle, the vehicle alternator 120 powers the operation of the fan 133 and thermo-electric cooler 110. During this time, the thermo-electric cooler 110 operates to heat the hot side ceramic plate 116 and cool the cold side ceramic plate 115. As previously described, this thermal energy is transferred via heat exchangers 122 and 124 for delivery to the bunk area 15 of the vehicle. Energy storage panels 140 and 142 are disposed downstream of the heat exchangers 122 and 124 and are filled with a phase change material. The panels 140 and 142 utilize the phase change to store thermal energy for later release. As will be described below, this provides for the heating and air conditioning ability during down time, or discharge cycle. For example, a phase change material having a phase change temperature of 50° F. may be used in the first array or cold side array of energy storage panels 140. As the motor vehicle operates and the blower 133 delivers recirculated air (e.g., 70° F.) across the cold side heat exchanger 122 to output cool air (e.g. 45° F.) to the first array of energy storage panels 140, the material within those panels 140 changes state or phase, and stores energy in connection with this phase change. As is known, the stored energy is proportional to the mass of the phase change material.

Once the vehicle engine is shut down, the operation of the auxiliary cooling system is configured to power the fan 133 by the vehicle batteries, and the thermo-electric cooler 110 is shut down. In this regard, the temperature of the air delivered by fan 133 is not effected by the first heat exchanger 122. However, the air is cooled as it passes across the array of energy storage panels 140. At this time the blower valve 144 should be in position C.

The initial temperature of the energy storage panels will be substantially equal to the temperature of the air output from the heat exchanger 122 near the end of the charging cycle. For purposes of illustration, assume this temperature is 45° F. Further assume that the particular phase change material utilized in the energy storage panels 140 has a phase change temperature of 50° F. At the onset of the discharge cycle, air delivered by blower 133 across the array of energy storage panels 140 is cooled by virtue of the mass of the panels 140 and the temperature thereof. As the discharge cycle continues, however, thermal energy from the air delivered by fan 133 is transferred to the energy storage panels 140. As a result, the air directed across the energy storage panels 140 to the bunk area 15 of the vehicle is cooled. It is appreciated that the material filling the energy storage panels 140 has a continued cooling effect even after its phase has totally changed from solid to liquid, until the temperature of the panels 140 to substantially the temperature of the recirculated air (e.g. 70° F.).

The energy storage panels 142 located on the hot side operate in the same fashion. Typically, however, the material used in panels 142 changes state at a higher temperature. It can be appreciated that, consistent with the concept and teachings of the present invention, a variety of phase change materials may be used in the energy storage panels 140 and 142. Indeed, it may be desired to select a material with a much lower phase change temperature for use in the cold side energy storage panels 140, and an elevated phase change temperature material in the hot side panels 142. One of ordinary skill in the art will appreciate that a number of phase change materials may be used and designed to closely control the temperature of the phase change.

For example, linear crystalline alkyl hydrocarbons having thermal energy storage properties characterized by differential scanning calorimetry (DSC) having melting and freezing temperature congruencies and thermal energy storage properties determined by carbon chain links C-8 to C-44 and higher. These materials are suitable for applications having a temperature range from 0° C. to 125° C. Similar results can be obtained for blends of pure alkyl hydrocarbons and many commercial paraffins from petroleum refining. Water, however, is the lowest cost and most widely used phase change material, and also has the highest thermal energy storage in both the solid-to-liquid transition (thermal storage of 80 calories per gram) and liquid-to-gas transition (thermal storage of 545 calories per gram). Since the selection of the specific phase change material does not form part of the present invention, it will not be further described herein. Rather, it is noted that one of ordinary skill in the art will appreciate the selection process for a particular phase change material to suit the needs of a specific application of the present invention.

Turning now to the electrical connections of the alternator 120 and the thermo-electric cooler 110, a switch 220 is illustrated as selectively connecting the thermo-electric cooler 110 to the alternator 120. This switch 220 is maintained in the closed position to charge the thermo-electric cooler 110 and energy storage panels 140 or 142, while the engine of the motor vehicle is running. It is likewise maintained in the open position while the engine is off.

Also shown in FIG. 3 is a blower valve 144. This valve 144 is located near the output of the blower 133 and at the juncture of hot side and cold side pair of delivery channels 168 and 169 leading to the first and second heat exchangers 122 and 124. During the charging cycle, the blower valve 144 would be in intermediate position A as shown, allowing air output from the blower 133 to be directed down both the hot side and cold side channels 168 and 169. In this way, both arrays of energy storage panels 140 and 142 are charged. During the discharge cycle, however, the blower valve 144 is moved into either position B or C and the power to the thermo-electric cooler 110 is shut off (i.e., vehicle is shut down).

When the blower valve 144 is disposed in position B, air from blower 133 is directed across the hot-side energy storage panels 142, which warms the air before it is delivered to the bunk space 15. Since no air flow is directed across the cold-side energy storage panels 140, the energy stored therein has a negligible effect on the bunk temperature. Moreover, recirculating warm air from the bunk through blower 133 and across the hot-side energy storage panels 142 improves the heating efficiency during the discharge cycle.

Similarly, when the blower valve 144 is disposed in position C, air from blower 133 is directed across the cold-side energy storage panels 140, which cools the air before it is delivered to the bunk space 15. It is appreciated that no substantial air flow is directed across hot-side panels 142, and the energy stored therein has a negligible effect on the bunk temperature. Thus, controlling the position of blower valve 144 between positions B and C controls the heating and cooling of the bunk space during the discharge cycle, while the vehicle is shut down.

It is further appreciated that temperature control may be achieved by controlling the fan speed of blower 133.

Alternatively, temperature control may be achieved by disposing the blower valve 144 in some intermediate position. For example, heating temperature may be controlled by variably disposing valve 144 between positions A and B. Cooling temperature may be controlled by variably disposing valve 144 between positions A and C.

Figure 4:
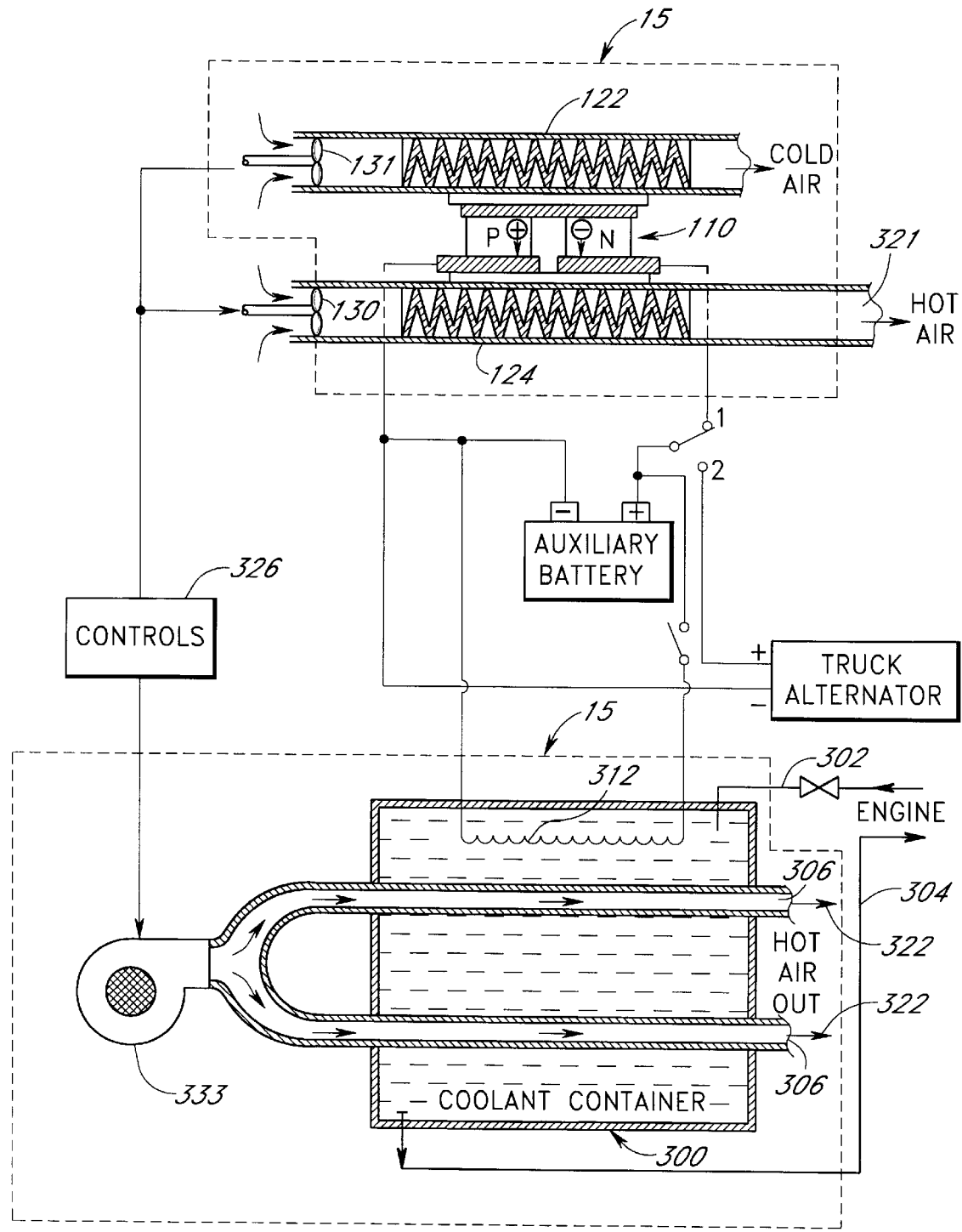
FIG. 4 is a schematic diagram of an alternative embodiment of the present invention similar to that shown in FIG. 2, utilizing a thermo-electric cooler to provide auxiliary cooling to the bunk area of a motor vehicle, and also utilizing an electric heater in connection with the engine cooling system to provide auxiliary heating to the bunk area.

Referring now to FIG. 4, another embodiment of the present invention is shown. The embodiment of FIG. 4 is similar to the embodiment of FIG. 2 insofar as the auxiliary cooling or air conditioning system is structured and operates. In this regard, a thermo-electric cooler 110 is disposed in connection with heat exchangers 122 and 124 to transfer and deliver air by fans 130 and 131, and using heat exchanger 122 to cool the air and heat exchanger 124 to warm the air. The warm air is expelled outside the bunk area to ambient space, while the cool air is delivered to the bunk area 15 for cooling purposes.

For purposes of providing auxiliary heat, a separate container 300 substantially filled with engine coolant is provided. During normal engine operation, engine coolant is circulated through line 302 into the container 300 and out line 304. When the engine is shut down, the substantial mass of the engine coolant within container 300 serves to sustain the heat stored therein for a substantial period of time, during which auxiliary heating may be effected. A plurality of air passageways 306 are provided in the container 300 for transferring and heating air. In this regard, a blower 333 forces air through passages 306. The passages 306, being substantially surrounded by the hot mass of the engine coolant in container 300, serve to heat the air blown therethrough to deliver hot air to the output. To extend this time and thereby further enhance the auxiliary heating of the present invention, a heater element 312, electrically connected to the auxiliary battery 118 is submerged within the engine coolant. During the discharge cycle, while the auxiliary heater is operative, the heater element 312 is active, and serves to sustain the heat within the coolant of container 300. Of course, the electric heater 312 can be located anywhere within the bunk area 15 to supply the auxiliary heat.

It is further noted that the outputs of the heat exchangers 122 and 124 and the output of passages 306 extending through container 300 are illustrated as open to freely flow into the bunk space 15 and ambient. It will be appreciated that, indeed, in one embodiment the independent operation of the auxiliary air conditioner and auxiliary heater may be controlled by a set of user controls 320 provided within the passenger space of the vehicle. In its simplest form this control may be provided to control the power on/off to the fans 130 and 131 and blower 333. When auxiliary heating is desired, the controls 320 are effected to turn off fans 130 and 131 and turn on blower 333. Although not illustrated, the controls 320 may also be utilized to turn off the thermoelectric cooler 110 when auxiliary heating is desired.

Figure 5:
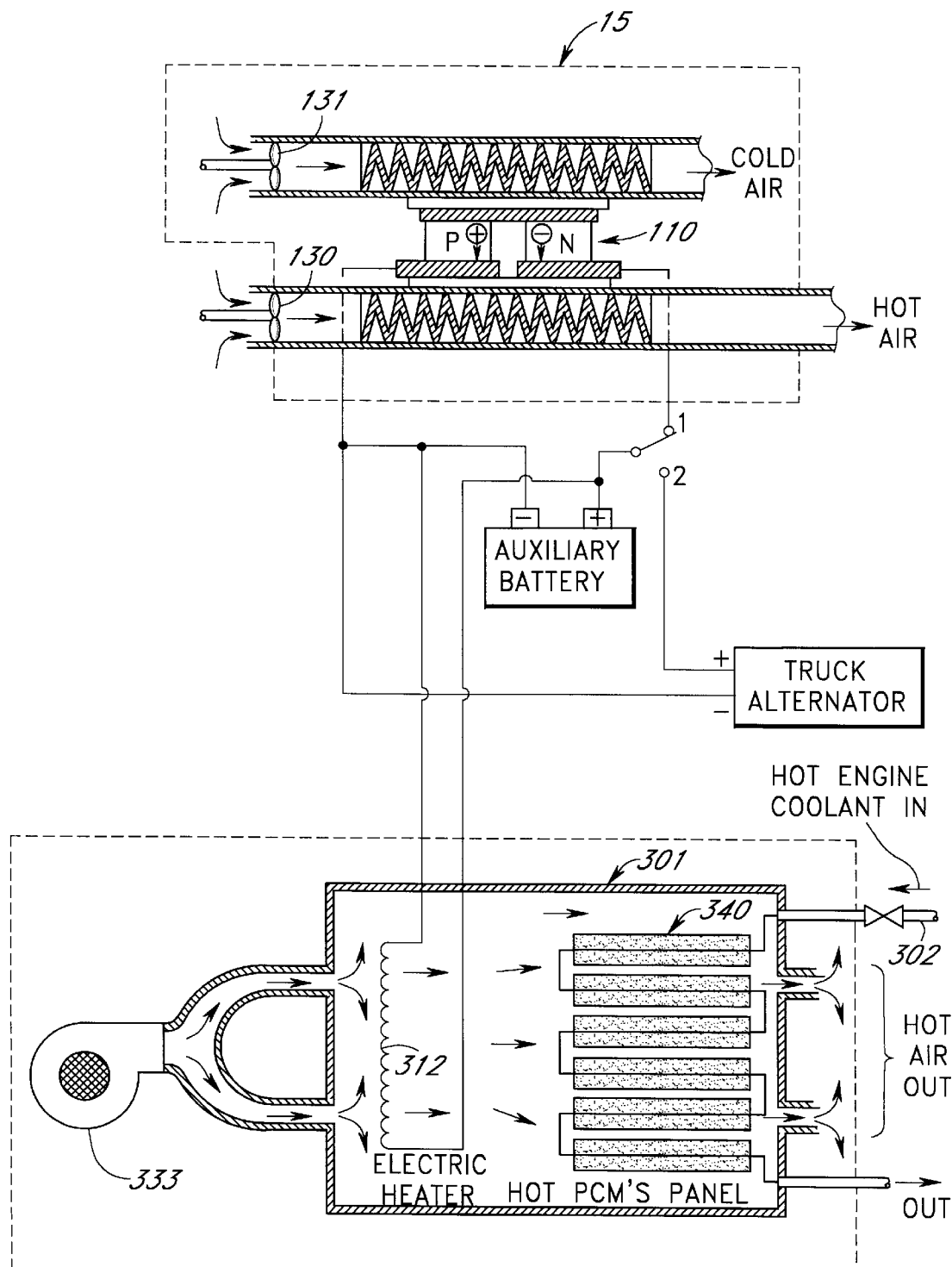
FIG. 5 is a schematic diagram of an alternative embodiment of the present invention similar to that shown in FIG. 4, wherein the auxiliary heating further includes thermal storage panels in connection with the engine cooling system and electric heater to provide auxiliary heating to the bunk area.

Reference is now made to FIG. 5, showing yet a further embodiment of the present invention. The embodiment of FIG. 5 is similar to the embodiment illustrated in FIG. 4 with the embodiment of FIG. 5 further using an array of energy storage panels 340 disposed a channel 301 to replace the coolant container 300. The energy storage panels 340 are disposed in connection with an engine coolant line 302 and are charged therefrom. Since the engine coolant temperature reaches relatively high temperatures the phase change material may be selected to have a relatively high phase change temperature. Therefore, both sensible heat as well as latent heat are utilized. Specifically, since the engine coolant typically reaches temperatures of 160 to 180° F., sensible heat energy is realized or achieved by virtue of the mass of the energy storage panels 340 and the energy required to bring the temperature of the phase change material from 160° down to approximately 75 to 80° F. The benefits of latent energy are realized or achieved by virtue of the energy required to change the phase change material from liquid to solid state. In this embodiment, it is preferred to utilize a material having a phase change temperature of approximately 150° F. Therefore as the temperature of the air surrounding the phase change material decreases, the phase change material will tend to maintain its 150° temperature until the entirety of the phase change material has changed from liquid to solid phase, thereby capitalizing on the latent energy stored within the phase change material.

Like the embodiment illustrated in connection with FIG. 4, a heating element 312 is provided in the embodiment of FIG. 5 to provide an additional heating during the motor vehicle resting cycle.

To more particularly illustrate the thermal storage characteristics of the panels containing phase change materials, consider the following numerical example. In a system utilizing a phase change material having a freezing/melting temperature of 150° F. and a mass of 50 lbs., where the latent heat capacity is 80 BTU per pound and the sensible specific heat is 0.88 BTU per pound F. Assuming a final temperature of 70° F. for the phase change material, the total latent heat is 4,000 BTU and the total sensible heat is 3,520 BTU. Therefore, the total heat (or stored energy) for a 50 lb. panel of phase change material is approximately 7,520 BTU. It is appreciated that the latent and sensible specific heat capacities are defined by the particular material chosen.

Figure 6:
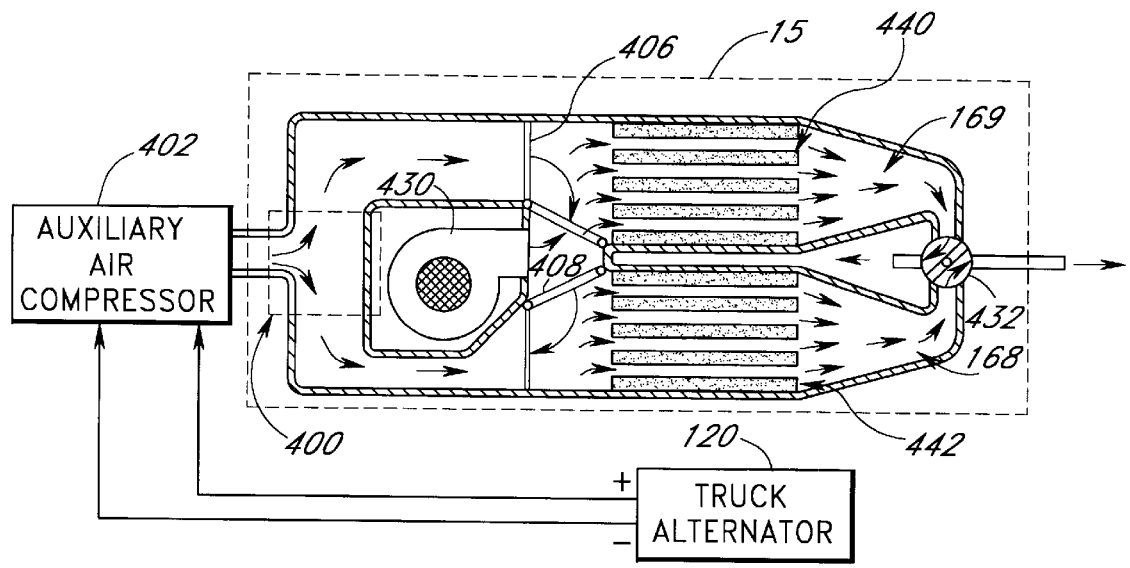
FIG. 6 is a schematic diagram of an alternative embodiment of the present invention utilizing a vortex tube in connection with thermal storage panels to provide heating and cooling to the bunk area of a motor vehicle.

Referring now to FIG. 6, an alternative embodiment of the present invention is shown. This embodiment is similar to the embodiment described in connection with FIG. 3 in that it has two arrays of energy storage panels 440 and 442 disposed within the output channels 169 and 168 of the cold air side and hot air side of the auxiliary heating and cooling system. It has an output control valve in fluid communication with both cold air channel 169 and hot air channel 168, wherein the valve 432 is disposed to alternatively direct the air from one of the channels to the bunk area 15 of the motor vehicle and expel the air from the opposing channel to the ambient space outside the motor vehicle.

In contrast to the embodiment of FIG. 3, however, the embodiment of FIG. 6 utilizes a vortex tube 400 to generate streams of hot and cold air, which in turn are directed across the arrays of energy storage panels 440 442. Vortex tubes have found use in industrial cooling applications and, as will be understood by one of ordinary skill in the art, operate to convert compressed air into two air streams, one hot and one cold. Vortex tubes are passive elements operating solely from compressed air and have no moving parts, require no electricity and no freon. Vortex tubes are known to provide refrigeration of up to 6,000 BTU or temperatures to –50° F. using only filtered factory compressed air at 100 PSIG. A control valve (not shown) is disposed in the hot air exhaust (up to 212° F. exhaust temperatures) to adjust temperatures, flows, and refrigeration over a wide range.

As will be understood by persons of ordinary skill in the art, a vortex tube operates by directing compressed air into a tangentially drilled stationary generator (i.e., vortex generation chamber), which forces the air to spin in a helical path along the tube's inner walls toward the hot air control valve. Air spinning this way often reaches sonic speeds of up to 1 million RPM. A percentage of this air exits through a valve at the hot air exhaust and the remaining air is forced back through the center of the sonic-velocity air stream where, although still spinning, it moves at a much slower speed. As a result, the inner, slower-moving air column gives up heat to the outer, faster moving air column. By the time the slower moving inner air column exits through the cold air exhaust (opposite the hot air exhaust), it has reached extremely low temperature (down to −50° F.). As is known, a variety of vortex tubes are commercially available and designed to various specifications. Thus, vortex tubes are available which can operate off a variety of compressed air inputs to provide a variety of hot and cold air temperature outputs.

In keeping with the description of FIG. 6, the alternator 120 may be used to power an air compressor 402 which provides the compressed air input to the vortex tube 400 which, in the manner described above, serves to generate hot and cold output air streams. These air streams are in turn directed across a cold side array of energy storage panels 440 and a hot side array of energy storage panels 442 respectively. Preferably an existing air compressor within the motor vehicle will be used for this purpose. However, an auxiliary air compressor may be used.

More specifically, during the charging cycle, while the vehicle is running, the alternator 120 powers the air compressor 402 which in turn feeds compressed air into the vortex tube 400. The output of the vortex tube charges the arrays 440 and 442 of energy storage panels forcing them to change states and store energy in a manner previously described. Due to the extreme temperatures which may be achieved by the vortex tube, the material used in the energy storage panels may be designed to changes phases at extreme temperatures (for example, temperatures of −40° to −20° F. on the cold air side and temperatures of 150° to 210° F. on the hot air side). This approach, likewise, achieves substantial benefits of both latent energy and well as sensible energy from the energy storage panels 440 and 442. For example, consider a 30 lb. panel filled with water as the phase change material, whereby the freezing/melting temperature is 32° F. The latent heat capacity for this phase change material is 132 BTU per pound and the sensible specific heat is 10 BTU per pound F. Again, assuming a final temperature of 70° F., the total latent heat is 3,960 BTU and the total sensible heat is 1,140 BTU. Therefore, the total heat stored in a 30 lb. panel containing water is 5,100 BTU.

A blower 430 is provided to operate when the vehicle engine is shut down to provide the air flow for auxiliary heating and cooling In this regard, blower valves 406 and 408 are provided to appropriately direct the flow of air across either the cold side energy storage panels 440 or the hot side energy storage panels 442. As illustrated in FIG. 6, the first blower valve 406 is in position 1 while the second blower valve 408 is in position 2. This directs air output from the blower 430 across the cold side energy storage panels to affect auxiliary cooling. Conversely, the first blower valve 406 may be disposed in position 2 and the second blower valve 408 disposed in position 1 to affect auxiliary heating.

The control valve 432 is disposed at the output to direct one channel of air to the bunk area 15 of the vehicle and direct the other channel of air to ambient space outside the vehicle during the charging cycle. It should be noted that the control valve 432 illustrated in the drawings has been provided merely for purposes of illustration and may be realized by various alternative structures. For example, independent control valves may be provided at the output of both the cold air channel and the hot air channel to individually direct the output therefrom either to the ambient or to the interior bunk space. In this regard, the extreme temperatures generated by the hot and cold air exhaust of the vortex tube 400 during the charging cycle may be directly expelled to ambient space, as the interior bunk space 115 becomes excessively hot or excessively cold. Furthermore, it is appreciated that the blower valves 406 and 408 may each be disposed in position 2 during the charging cycle so that air output from both channels of the vortex tube 400 will be directed across the energy storage panels 440 and 442. In this way, both energy storage panels are charged, thereby readying the system for either auxiliary heating or cooling during the discharge cycle.

As previously described, it is generally anticipated that the blower 430 will generate the air flow for the auxiliary heating or cooling of the illustrated embodiment. However, after operating for several hours in the discharge cycle, where the material in the energy storage panels 400 and 442 has substantially expended the heat transfer characteristics, or discharged, an auxiliary power source may be utilized to power the air compressor 402 to in turn provide additional auxiliary heating or cooling. Thus, hot and cold air discharged from the vortex tube 400 is directed through the channels 168 and 169. The hot and cold air is not only selectively discharged into the bunk area 15 by valve 432, but also operates to recharge panels 440 and 442. In this way, after a period of time, the air compressor 402 operation may be discontinued, and the blower 430 used to provide continued flow of air across recharged panels 440 and 442.

Figure 7:
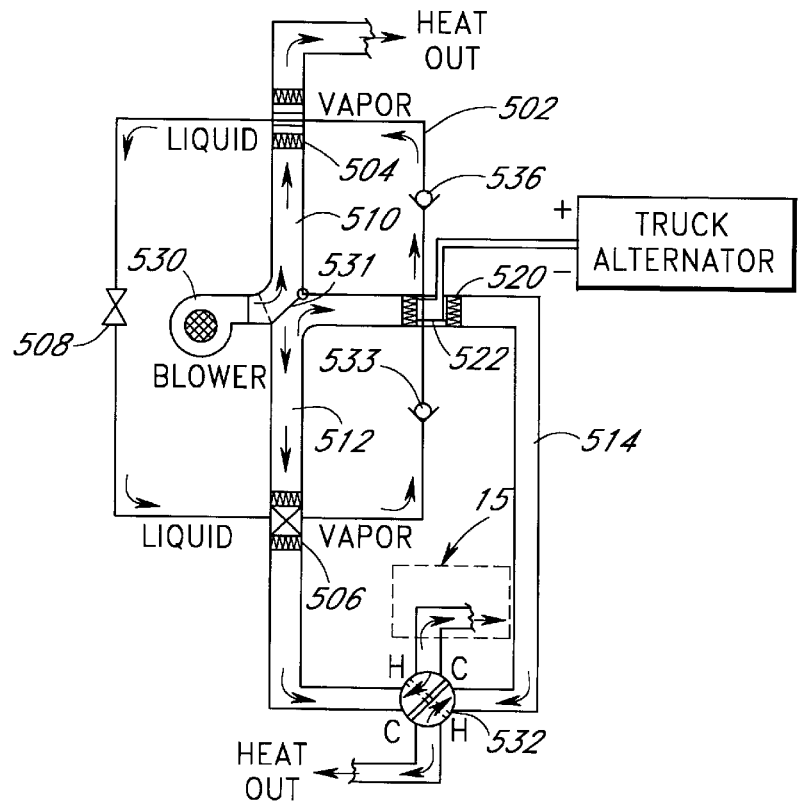
FIG. 7 is a schematic diagram of an alternative embodiment of the present invention utilizing adsorption refrigeration technology to provide heating and cooling for the bunk area of a motor vehicle.

Referring now to FIG. 7, a further embodiment of the present invention is shown. The embodiment illustrated in FIG. 7 utilizes sorbent material and sorption refrigeration technology (including adsorption and absorption) to achieve the auxiliary heating and cooling of the present invention. To more particularly illustrate the sorption refrigeration technology in the present invention, consider the following adsorption refrigeration-based heating and cooling system. Generally, adsorption systems utilize a solid sorbent material and liquid-vapor refrigerant (known as solid-vapor systems). The adsorption systems utilize the process of adsorption, which is the adhesion of an extremely thin layer of gaseous molecules to the surface of solid bodies, and desorption which is the release of the thin gaseous material (i.e., refrigerant vapor) from the solid material. Ammoniates and hydrates of metal and organic salts are materials that can reversibly bond and release large quantities of refrigerant (ammonia or water). In these substances, the water or ammonia forms a special type of covalent bond (called a coordinative bond) with the central sorbent molecule, thereby forming complex compounds. The term "chemesorption" is used to uniquely identify complex compound sorption reactions. Following the sorption process, the sorbent beds are temperature-shifted, so that the fully adsorbed bed is heated for desorption and the fully desorbed bed is cooled to ambient for adsorption. Control of the cycle is achieved by cycling heat transfer media to the adsorbent beds.

Although the foregoing has been provided for general background information, it is understood that one of ordinary skill in the art will appreciate the implementation and operation of adsorbent systems to facilitate the practice of the present invention.

In keeping with the description of FIG. 7, a refrigerant circulatory system is provided and includes a refrigerant line 502 disposed in a circuitous path. A refrigerant condenser 504 and evaporator 506 are spaced apart and serially disposed within the circuitous path of the refrigerant line 502. Refrigerant circulated through the refrigerant line is vaporized by the evaporator 506 and subsequently condensed to liquid form by condenser 504. Circulation of the refrigerant is controlled by refrigerant control valve 508.

A blower 530 is provide to circulate air for the auxiliary heating and cooling system. A first air passageway 510 is provided and disposed to intersect the condenser 504. As is known, condensing liquid releases heat energy. Therefore air blown across the coils of the condenser 504 heats the air and thus transfers the heat generated by condenser 504 to the ambient as shown during vehicle operation. A second air passage 512 is disposed to intersect the evaporator 506. As is known, refrigerant evaporators absorb heat in the chemical transformation of the refrigerant from liquid to gaseous or vapor states. Therefore, air blown by the blower 530 across the evaporator 506 generates a cool air stream (i.e., heat transferred from air to evaporator 506) downstream of the evaporator 506 during the vehicle resting cycle. A third passage 514 is also provided and is directed for distributing air through the sorbent container 520. Therefore, air blown by the blower 530 across the sorbent container 520 heats the air and thus transfers the heat generated by sorbent container 520 to the ambient during the air conditioning cycle, and to the bunk 15 during the heating cycle. In this regard, a sorbent container 520 is disposed in connection with this third passage 514. An electric heater element 522 electrically connected to the vehicle alternator is used to heat the sorbent material within the sorbent container 520 while the vehicle is operating. It will be appreciated that alternative means may be provided to heat the sorbent material. For example, a segment of the engine coolant line may be coiled and disposed within the sorbent container 520 to heat the material. Alternatively, a segment of the engine oil system may be coiled or otherwise disposed within the sorbent container 520. As the oil heats, along with the engine temperature, it serves to heat the sorbent container 520.

As illustrated, the refrigerant line 502 is also passed through the sorbent container 520. Refrigerant in the vapor state is adsorbed into the solid sorbent material. During the discharge cycle, while the vehicle engine is shut down, desorption (as describe above) occurs. A blower control valve 531, refrigerant check valves 536 and 533, and refrigerant control valve 508 are also provided to facilitate the charging and discharge cycles of the illustrated embodiment.

To more specifically describe the charging cycle of the illustrated embodiment, blower control valve 531 is positioned in position 1 as shown. The first check valve 536 is opened and the second check valve 533 and refrigerant control valve 508 are closed. Refrigerant previously adsorbed into the sorbent material is desorbed and passes through the condenser 504 and is liquified. The output of the blower 530 is directed by blower valve 531 through the first air passage 510 to carry heat from the condenser 504 to the ambient.

During the discharge cycle, blower control valve 531 is disposed in position 2 whereby the airflow from the blower 530 is directed through both passages 512 and 514. The refrigerant control valve 508 and the second check valve 533 are opened and the first check valve 536 is closed. During this stage, the liquid refrigerant passes through the evaporator to change from liquid to vapor state and is delivered to the sorbent container 520 where it is adsorbed into the sorbent material contained therein. The air delivered through channel 512 is cooled as it passes across evaporator 506. In contrast, the air passing across the sorbent container is heated by the sorbent container 520. Auxiliary heating and cooling of the bunk area 15 is controlled by the air control valve 532. When the control valve 532 is disposed in position C—C as shown, cool air transferring down passage 512 is routed to the bunk area 15 to provide auxiliary cooling while warm air passing down air passage 514 is expelled to the ambient. Conversely, if control valve 532 is disposed in position H—H then warm air channeled down passage 514 is expelled into the bunk area 15 to provide auxiliary heating while the cool air channeled down passage 512 is expelled to the ambient.

Figure 8:
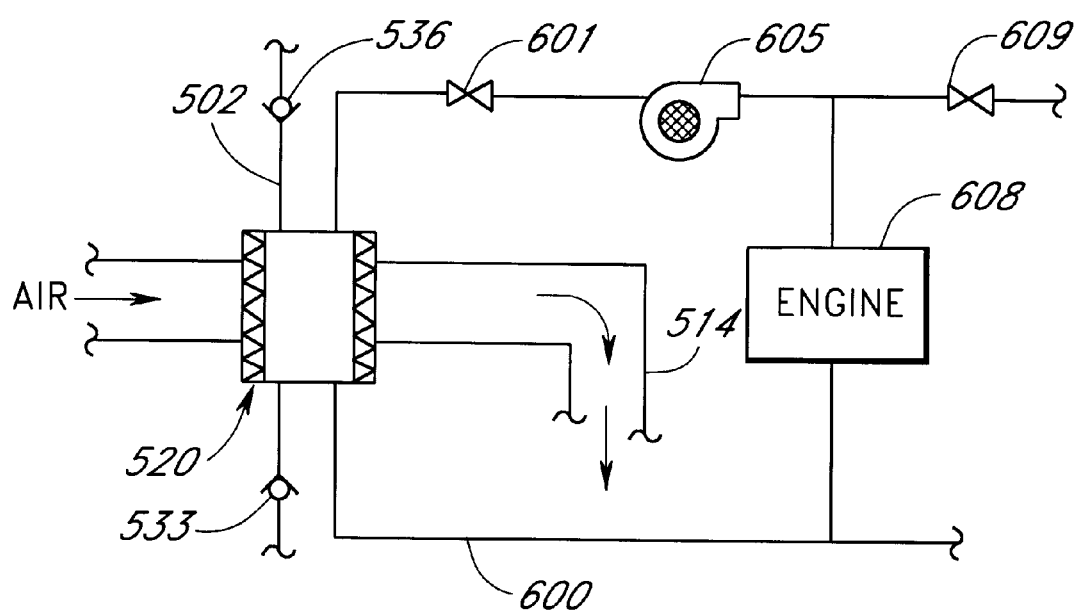
FIG. 8 shows another embodiment of the present invention.

Sorbent technology may also be utilized to preheat the vehicle engine in cold weather climates. In this regard, reference is made to FIG. 8, showing a portion of the system described in FIG. 7. More particularly, the sorbent container 520 may be disposed in connection with a circuitous refrigerant line 502 and air passage 514 as described above. A line 600, however, from the vehicle's coolant system is also disposed in connection with the sorbent container 520. A flow valve 601 and fluid pump 605 are serially disposed with the coolant line 600 to control the flow of fluid therethrough. As schematically illustrated (and as is known), the coolant line 600 passes through the vehicle engine 608. A second flow valve 609 is also provided to control the fluid flow to other components such as a radiator and heater (not shown).

While the vehicle is running, the sorbent material within the sorbent container 520 is charged to store thermal energy, as described in connection with FIG. 7. In cold weather climates, after the engine has been shut down for a period of time, it may desired to preheat the engine before starting the vehicle. In this regard, the thermal energy stored in the sorbent container 520 may be transferred to heat the engine coolant within the coolant line 600. The pump 605 may then circulate the coolant through the engine 608, to preheat the engine before starting.

All of the references cited herein are hereby incorporated in their entireties by reference.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An auxiliary heating and air conditioning system having an output for selectively delivering warm and cool air to the passenger area of a motor vehicle comprising:

a refrigerant circulatory system having a circuitous refrigerant line, the refrigerant system further having an evaporator and condenser serially disposed within the circuitous line operative to vaporize and condense the refrigerant fluid;

a container having a sorbent material for adsorbing vaporized refrigerant, the container disposed to intersect the refrigerant line;

a heating element disposed within the sorbent container;

a multi-channel ventilation system having a blower disposed to force air through the channels of the system and to the output, the channels being further disposed to intersect the evaporator, the condenser, and the sorbent container; and a blower valve disposed within the multi-channel ventilation system and operative to direct air flow from the blower across the condenser, during a charging cycle wherein the blower valve is operative to direct air flow from the blower across both the evaporator and sorbent container during a discharge cycle, and wherein the sorbent container serves to warm air as it passes across the sorbent container and the evaporator serves to cool air as it passes across the evaporator.

2. The auxiliary heating and air conditioning system according to claim 1, further including an output valve operative to controllably direct air passing across the sorbent container to a passenger area of the motor vehicle and to ambient space outside the passenger area.

3. The auxiliary heating and air conditioning system according to claim 2, wherein the output valve is further operative to controllably direct air passing across the evaporator to the passenger area of the motor vehicle and to ambient space outside the passenger area.

4. The auxiliary heating and air conditioning system according to claim 1, wherein the heating element comprises an electric heater.

5. The auxiliary heating and air conditioning system according to claim 1, wherein the heating element comprises a segment in fluid communication with the vehicle coolant system.

6. The auxiliary heating and air conditioning system according to claim 1, wherein the heating element comprises a segment in fluid communication with the vehicle oil system.

* * * * *